United States Patent [19]

Sobajima et al.

[11] 3,967,285

[45] June 29, 1976

[54] METHOD FOR FORMING IMAGES BY DIFFERENTIAL OXIDATION

[75] Inventors: Shigenobu Sobajima, Hachioji; Hiroshi Okaniwa; Kiyoshi Chiba, both of Hino; Norio Takagi, Ogaki, all of Japan

[73] Assignee: Teijin Limited, Osaka, Japan

[22] Filed: Jan. 17, 1975

[21] Appl. No.: 542,042

Related U.S. Application Data

[62] Division of Ser. No. 378,241, July 11, 1973, Pat. No. 3,902,180.

[30] Foreign Application Priority Data

| | | |
|---|---|---|
| July 12, 1972 | Japan | 48-69039 |
| July 17, 1972 | Japan | 47-70726 |
| Sept. 4, 1972 | Japan | 47-87902 |
| Dec. 25, 1972 | Japan | 48-368 |
| Dec. 27, 1972 | Japan | 48-2232 |
| May 4, 1973 | Japan | 48-49014 |

[52] U.S. Cl. .......... 346/74 E; 178/6.6 A; 331/94.5 M

[51] Int. Cl. .......... G01d 15/34; C23c 13/00

[58] Field of Search .......... 346/74 E, 74 ES, 74 S, 346/74 SC, 76 L; 331/94.5, DIG. 1; 340/174 YC; 178/6.6 A

[56] References Cited

UNITED STATES PATENTS

| | | | |
|---|---|---|---|
| 3,657,510 | 4/1972 | Rothrock | 331/DIG. 1 |
| 3,713,996 | 1/1973 | Letter | 346/74 E |
| 3,718,913 | 2/1973 | Maloney | 346/74 E |
| 3,740,761 | 6/1973 | Fechter | 346/76 L |
| 3,891,513 | 6/1975 | Yasumori | 346/74 E |

*Primary Examiner*—Alfred H. Eddleman
*Assistant Examiner*—Jay P. Lucas
*Attorney, Agent, or Firm*—Sherman & Shalloway

[57] ABSTRACT

When a file having coated thereon an electrically conductive coating which is transparent in a highly oxidized state and non-transparent in a lowly oxidized state or in a reduced state, such as a coating of indium oxide, is heated electrically or by laser beams or oxidized and/or reduced by electrolytic reaction, images consisting of transparent and non-transparent areas are formed on the film. This can be utilized, for example, in a facsimile system.

7 Claims, 13 Drawing Figures

$10^{-1}$
$10^{-2}$
$10^{-3}$
AREA OF PICTURE ELEMENT ($mm^2$)
$10^{-4}$
$10^{-3}$
RECORDING ENERGY (mj)

METHOD FOR FORMING IMAGES BY DIFFERENTIAL OXIDATION

This is a division, of application Serial No. 378,241, filed July 11, 1973 now U.S. Pat. No. 3,902,180.

This invention relates to a method for direct recording which involves the formation of images on a recording material using electric signals that are generated sequentially with passage of time. More specifically, this invention relates to a method which comprises scanning an original, and converting the resulting picture element signals into images without modulation, or a method which comprises modulating the picture element signals, demodulating the signals, and converting the signals to images. Such a method can be utilized for a variety of applications, for example, as a receiving method for a facsimile system.

A number of methods have been proposed previously for forming images on recording material utilizing electric signals generated successively, such as a dry electrosensitive (sparking) recording method, a recording method using laser beams, or an electrolytic recording method.

The discharge breakdown recording method involves forming an electrically conductive layer of carbon on an insulating material and coating an insulating coating material such as white titanium oxide to form a recording material, applying a voltage of 150 to 200 V between the recording material and a recording needle electrode, and breaking a layer of the titanium oxide by sparking thereby to expose the black carbon layer and effect recording. According to another embodiment, a recording material comprising an insulating base material having formed thereon a thin coating of a metal such as aluminum is used, and a voltage of 50 to 150 V is applied between the recording material and a recording electrode whereby the metal coating is broken by sparking and thus recording is effected (disclosed, for example, in U.S. Pat. No. 2,836,479).

However, these conventional dry electrosensitive recording methods require fairly high voltages for breakdown by sparking, and also have the defect that dusts and dirts scatter about during recording to give off offensive smell.

A recording method utilizing a laser beam instead of the dry electrosensitive (sparking) recording was proposed (U.S. Pat. No. 3,720,784), which comprises applying a laser beam to a recording material comprising a base and a thin coating of metal formed thereon to evaporate and scatter the metal by the heat energy of the laser beam and thereby to provide micropores in the metal coating. This method also has the defect that during recording, dirts and dusts scatter, and as a result, the pores rise in the crater-like form, making it generally difficult to obtain images of high clarity.

An example of the electrolytic recording method is one which comprises flowing electric current from a recording metal electrode to a recording paper impregnated with an electrolytic solution to transfer metallic ions from the electrode and develop colors whereby recording is effected (Horgan Faximile Corporation, Technical Bulletin, July 1967). The known combination of the electrolyte and the metal of the electrode is, for example, a combination of potassium ferricyanide and iron, a combination of phenol and iron, or a combination of dimethyl glyoxime and nickel. Another form of the electrolytic recording method involves forming a layer of a metal such as aluminum on a base such as paper, coating a photoconductive layer composed mainly of zinc oxide, and depositing the metal from the electrolytic solution utilizing the memory effect of the photoconductive layer (see U.S. Pat. No. 3,010,883).

However, in the conventional electrolytic recording method such as described above, the structure of the recording material is somewhat complicated because of the need for retaining a given electrolytic solution in the inside of the recording material. Furthermore, the recording material is non-transparent in general, and therefore, it is impossible to obtain transmission-type recorded images. Moreover, since the recording material itself contains the electrolytic solution, the recording characteristics are liable to undergo the effect of humidity, and the dimension of the recording material is liable to fluctuate. There is a further defect that the recorded images tend to discolor or bleed out. The base material of the conventional electrolytic recording material generally requires permeability of electrolytic solutions, transparent polymeric films having superior properties in respect of strength, flexibility, dimensional stability, etc., such as a polyethylene terephthalate or cellulose triacetate film, cannot be used as the base material.

The present invention provides a recording method free from the above-described defects and a recording material used in carrying out this method. We have now found that a coating of a low oxide of indium which is substantially non-transparent and has electric conductivity is oxidized by heating with a relatively low energy or by an electrolytic reaction at a relatively low voltage to indium oxide ($In_2O_3$) which is substantially transparent and electrically conductive. It has also been found that coatings of low oxide of tin, low oxide of titanium and low oxide of zirconium which is substantially non-transparent, and electrically conductive can be oxidized relatively easily by similar methods to higher oxides which are substantially transparent, and electrically conductive. The work of the inventors also led to the discovery that a coating of indium oxide which is substantially transparent, and electrically conductive is reduced by an electrolytic reaction at a relatively low voltage to a substantially non-transparent indium metal, and that the metallic indium is less susceptible to oxidation than a low oxide of indium and is stable. It has also been discovered that coatings of $SnO_2$, $TiO_2$, $ZrO_2$, CuI, CuCl, AgI and AgCl which are substantially transparent, and electrically conductive are reduced by an electrolytic reaction at a relatively low voltage same as in the case of a coating of $In_2O_3$ to the metals which are non-transparent.

The present invention provides a recording method in which images corresponding to electric signals are formed by using a coating of a metal compound which assumes a non-transparent state and a transparent state as described above.

According to this invention, a method for forming an image on an electrically conductive coating formed on a base material is provided which method comprises successively oxidizing and/or reducing the electrically conductive coating which is substantially transparent in a highly oxidized state and substantially non-transparent in a state reduced to a greater degree than the highly oxidized state, according to an applied electric signal.

The invention further provides a method for forming images from electric signals which comprises successively oxidizing and/or reducing a substantially non-transparent coating of at least one member selected from the group consisting of a low oxide of indium, a low oxide of tin, a low oxide of titanium and a low oxide of zirconium according to electric signals generated sequentially, thereby to form images.

Furthermore, the invention provides a method for forming images from electric signals, which comprises successively reducing a substantially transparent coating of at least one member selected from the group consisting of indium (III) oxide ($In_2O_3$), tin (IV) oxide ($SnO_2$), titanium (IV) oxide ($TiO_2$), zirconium (IV) oxide ($ZrO_2$), copper (I) iodide (CuI), copper (I) chloride (CuCl), silver iodide (AgI) and silver chloride (AgCl) according to electric signals generated sequentially.

An object of this invention is to provide a method for forming images of high resolution power from electric signals which are generated sequentially.

Another object of this invention is to provide a method for forming images composed of a transparent area and a non-transparent area.

Still another object of this invention is to provide a method in which a transmission-type image is obtained by using a transparent base material and a reflecting-type image is obtained by using a non-transparent base material.

Still another object of this invention is to provide a method for forming images at high speed by relatively low energy.

Still another object of this invention is to provide a method for forming stable images which are not affected by humidity.

Still another object of this invention is to provide a method for forming images in which a polyester film can be used as a base material and there is no need for impregnating the base material with an electrolytic solution.

A further object of this invention is to provide a direct recording method which can be utilized for receiving transmitted images in a facsimile system.

First, the base material and coating that constitute the recording material used in the methods for forming images in accordance with this invention will be described, and then various embodiments of the image-forming methods of this invention will be described.

The base material of the recording material used in this invention may be shaped articles of organic polymers, inorganic materials, and composites of these. Examples of the organic polymers useful in this invention are thermoplastic resins such as polyethylene terephthalate, polyethylene naphthalate, polycarbonate, polyacrylic ester, ABS, polystyrene, polyacetal, polyethylene, polypropylene and cellulose acetate resins, and thermosetting resins such as epoxy, diallyl phthalate, silicon, unsaturated polyester, phenol, and urea resins. These resins can be used either alone or in admixture. Examples of the inorganic material are glass materials such as soda glass, borosilicate glass or silicate glass, procelains such as those of the alumina, magnesia, zirconia or silica type, metal oxides, and semi-conductors of various compounds.

The base material is in various forms such as films, sheets or blocks. For example, for use in facsimile, flexible films or sheets are preferred, and for use in transmission-type recording materials, transparent or semi-transparent films are preferred.

Biaxially oriented polyester films are especially preferred base materials. The polyester films are films or aromatic polyesters, of which polyethylene terephthalate and polyethylene-2,6-naphthalene dicarboxylate are especially preferred. The superiority of polyester films represented by the polyethylene terephthalate and polyethylene-2,6-naphthalenedicarboxylate as a base material of the recording material used in this invention is ascribable primarily to their excellent mechanical properties, excellent transparency in the visible region, excellent thermal resistance, and excellent chemical resistance.

The polyethylene terephthalate and polyethylene-2,6-naphthalenedicarboxylate films have a strength at break of at least 15 $Kg/mm^2$ at room temperature, and can have a strength at break of more than 40 $Kg/mm^2$ in the longitudinal direction. These films have a high initial Young's modulus, usually at least 300 $Kg/mm^2$, and in special cases, more than 800 $Kg/mm^2$. Thus, in conjunction with their low water absorption, these films have extremely good dimensional stability which is important for the recording material used in this invention.

A 50-micron thick polyethylene terephthalate or polyethylene-2,6-naphthalenedicarboxylate film has a transmission of at least 75% with respect to light of a visible region having a wavelength 4000 A to 7000 A, and such films are suitable for optical information processing. The polyester films also have fairly high thermal stability. It is also advantageous to perform information processing in the wet state, and in such a case also, the polyester films can be utilized because of their superior chemical resistance.

The biaxially oriented films are those stretched longitudinally and transversely so as to render their mechanical properties suitable for an intended object. Those which have been stretched 3.0–5.0X in the longitudinal direction, and 2.5–4.5X in the transverse direction are preferred. These films can be produced by a simultaneous biaxially stretching method, a consecutive biaxial stretching method, or a three-stage stretching method in which further longitudinal stretching is performed after biaxial stretching.

The coating of the recording material used in the image-forming method of this invention may be any material which has a first substantially transparent highly oxidized state and a second substantially non-transparent state reduced from the first state both of which states have electrical conductivity and can be converted to each other by oxidation or reduction. The coating preferably has a transmission of visible light of at least 60%, especially at least 75%, in the first highly oxidized state, and a transmission of visible light of not more than 70%, especially not more than 30%, in the reduced state. Especially those coatings which can be formed at temperatures that do not harm the base of a polymeric material are preferred.

Coatings composed of a low oxide of indium, a low oxide of tin, a low oxide of titanium, a low oxide of zirconium or a mixture thereof have been found to meet the above requirements of the coating and to be convertible to a transparent state oxidized from an opaque state. The low oxide of indium is especially superior in respect of the degree of resolution and stability of the images formed. A coating of a mixture of a low oxide of indium with a small amount (for example, 1 to 20% by weight) of a low oxide of tin is especially preferred because of its enhanced stability.

The "low oxide of a metal", as used in the present specification and claims, denotes a metal oxide which is not oxidized to a maximum valency state. The low oxides of these metals are expressed by the following formulae.

| | |
|---|---|
| $(In)_x(O)_y$ | $0<y/x<1.5$ |
| $(Sn)_x(O)_y$ | $0<y/x<2$ |
| $(Ti)_x(O)_y$ | $0<y/x<2$ |
| $(Zr)_x(O)_y$ | $0<y/x<2$ |

For example, a low oxide of indium is a substance which is stoichiometrically expressed by $In_xO_y(0<y/x<1.5)$. This substance is a black electrically conductive substance obtained by subliming $In_2O_3$ in vacuo at a temperature of not less than about 850°C., which is considered to be a mixture comprising metallic indium, $In_2O$, InO, $In_2O_3$ and oxygen.

Coatings composed of indium (III) oxide ($In_2O_3$), tin (IV) oxide ($SnO_2$), titanium (IV) oxide ($TiO_2$), zirconium (IV) oxide ($ZrO_2$), copper (I) iodide (CuI), copper (I) chloride (CuCl), silver (I) iodide (AgI) and silver chloride (AgCl), or mixtures thereof have been found to meet the above requirements of the coating and being able to be converted to a non-transparent state by being reduced from a transparent state. Indium (III) oxide is especially superior in respect of the degree of resolution or stability of the images formed. A coating of a mixture of indium (III) oxide and a small amount (for example, 1 to 20% by weight) of tin is especially preferred because of its enhanced stability.

The formation of an electrically conductive coating on the surface of the base material can be effected by a method in which a metal oxide which will constitute the coating is coated by vacuum evaporation or sputtering, or a method in which the metal of a metal compound which will constitute the coating by vacuum evaporation, sputtering, plasma spraying, vapor-phase plating, chemical plating, or electroplating, followed if desired by a chemical treatment such as oxidation. There can also be used a method in which the coating is performed by a thermal decomposition reaction of a metal chloride or the like.

For example, in order to form a non-transparent coating of a low oxide of indium, a vapor of indium oxide is deposited on a base material. In the course of vacuum evaporation, indium oxide loses part of oxygen, and a coating of a low oxide of indium is formed on the base material.

The formation of a transparent indium (III) oxide coating is effected by heating in air or electrolyzing in an electrolytic solution the coating of indium low oxide formed by the above-described method.

Generally, the thickness of the coating is preferably 50 A to 5000 A, especially 100 A to 2000 A, so that the coating exhibits electric conductivity and can be oxidized and/or reduced with a relatively low energy. The surface resistivity is preferably not more than 100 kilo ohms/cm$^2$ in the case of a coating of indium oxide. Coatings having a surface resistivity of as low as about 10 ohms/cm$^2$ can be produced at present.

The following methods for forming images by oxidizing and/or reducing the coatings described above have been found.

1. A method wherein a non-transparent coating is successively oxidized according to electric signals to render it transparent, thus forming images.

2. A method wherein a transparent coating is successively reduced according to electric signals to render it non-transparent, thus forming images.

3. A method wherein a coating which is either transparent or non-transparent is successively oxidized and reduced selectively according to electric signals to form images composed of a transparent area formed by oxidation and an area assuming the metallic lustre formed by reduction.

4. A method wherein a coating which is either transparent or non-transparent is successively reduced according to electric signals to form an area which exhibits the metallic lustre, and then the unreduced area of the coating is oxidized to render it transparent, and thus forming images.

These methods will be described below by references to the accompanying drawings in which.

1. Method in which a non-transparent coating is successively oxidized according to electric signals to render it transparent, thus forming images In this case, the following methods have been found for oxidizing the coating according to electric signals.

(1-a) A method wherein electric current is applied to the coating, and the coating is oxidized by heat generated by the electric current.

(1-b) A method wherein the coating is oxidized by applying laser beams thereto and thus heating it.

(1-c) A method in which the coating is oxidized by an electrolytic reaction.

In these methods, the transmission of visible light through the coating which becomes a background should be as low as possible in order to obtain images of high contrast. The transmission of visible light is especially preferably not more than 30%. A coating composed mainly of a low oxide of indium is roughly black in color, and is especially preferred for obtaining images of high contrast. In order to lower the transmission, a minor amount of tungsten, molybdenum, tantalum, etc. may be added to the coating material.

The methods (1-a), (1-b) and (1-c) will be described in greater detail.

(1-a)

This method involves using a non-transparent electrically conductive coating (for example, a coating of a low oxide of indium) as one electrode and a neelde-electrode opposite thereto, applying a pulse voltage which changes in amplitude or pulse width according to information, and oxidizing the coating by Joules heat generated according to the amount of electricity flowing in the coating to render it transparent, thus forming images. Since a solid is evaporated according to the conventional dry electrosensitive recording method, an enormous amount of energy is required, and naturally high voltages and much current are required. However, according to the present invention, the coating can be rendered transparent merely by heat oxidizing it without the need for melting or evaporating a solid, and therefore the invention is very advantageous also from the viewpoint of energy required. Especially, a metal oxide, for example indium oxide, has a very low specific heat as compared with metal (that is, has small heat capacity), and therefore pulse voltage acts effectively for raising the temperature of the area to which the voltage has been applied.

For example, when an energy of 0.3 watt is applied for $10^{-5}$ second to a coating of a low oxide of indium having a thickness of 1000 A and an area of $3.14 \times 10^{-4}$ $cm^2$, the temperature of that portion rises to about 400°C. assuming that there is no dissipation of heat. Thus, it can be expected that information will be ble to be recorded at high speed using low voltage and small current.

Figure 1:
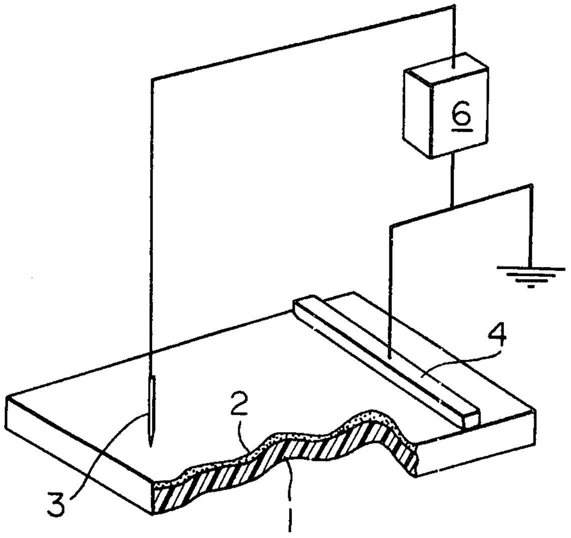
FIG. 1 is a view showing the principle of the recording method of this invention by electric current heating.
Figure 1A:
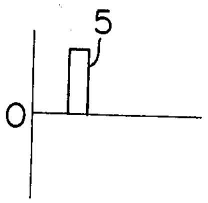

FIG. 1 shows the principle of a recording device for performing this method. The recording material is composed of a base material 1 and an electrically conductive coating 2. The recording device is constructed of a recording needle electrode 3 having a very small area of contact, a return electrode 4 having a relatively wide area of contact, and a pulse generator 6. The reference numeral 5 represents a general wave form of pulse to be applied to the needle electrode 3. When the pulse generator 6 generates a pulse signal, electric current flows from the recording needle electrode 3 to the return electrode 4 through the electroconductive coating. Since the area of contact of the recording needle electrode is small, heat is generated by the electric current at the portion of the coating which is in contact with the recording electrode 3, and that portion is oxidized by the heat. Since the oxidation is effected by Joules heat, the voltage to be applied to the recording electrode 3 may either be positive or negative with the potential of the return electrode 4 as a standard.

Using the recording device shown in FIG. 1, the recording characteristics of the coating of indium low oxide were examined. First, pulses of different widths were applied to the needle electrode 3 one by one, and the changes in the surface of the coating were examined. The results are shown in Example 1 in Table 1. Furthermore, the recording material in accordance with Example 2 (Table 1) was fed at a predetermined speed, and pulse signals having adjustable pulse width and amplitude and a certain repeated frequency are applied to the needle electrode 3, whereby the relation between the amplitude and the area of a picture element, the relation between the pulse width and the area of a picture element, and the relation between the recording energy and the area of a picture element were examined. The results are plotted in FIGS. 3, 4 and 5.

Figure 3:
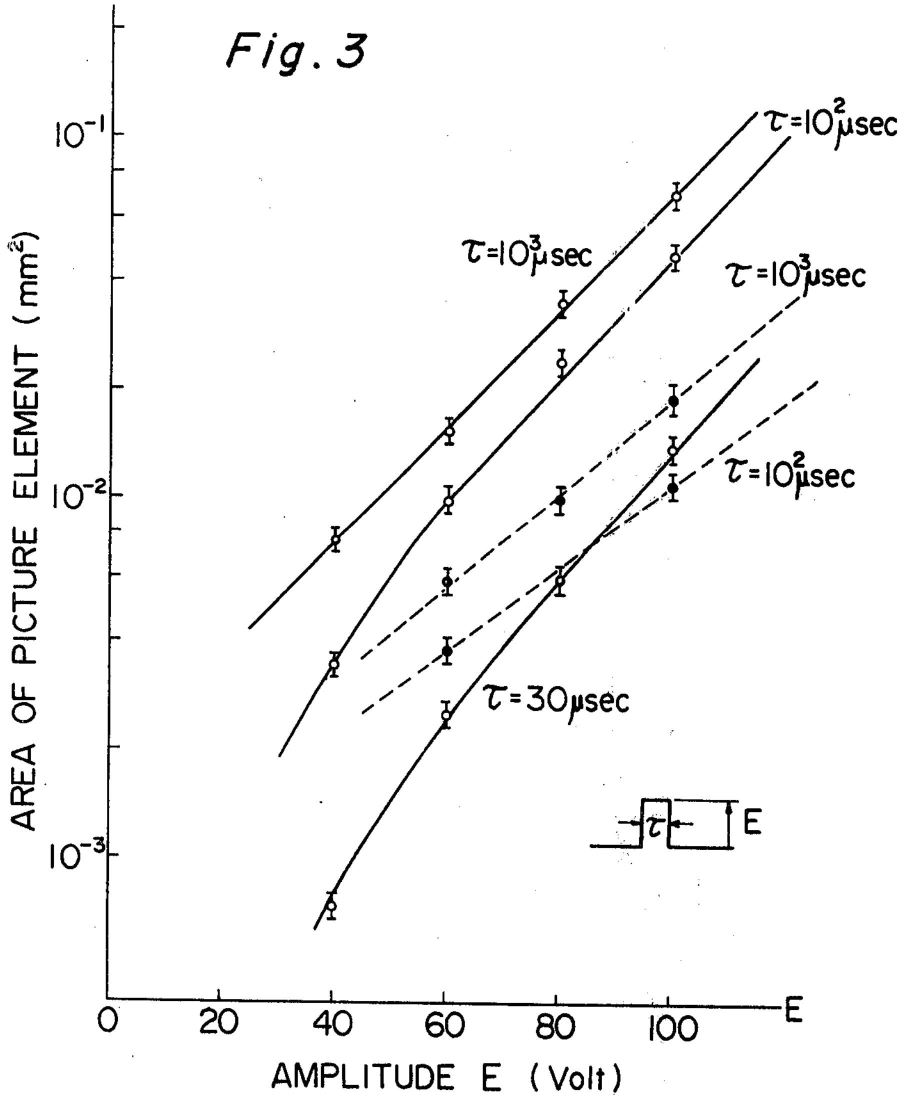
FIG. 3 is a graphic representation showing the relationship between the amplitude of a recording pulse and the area of a picture element.
Figure 4:
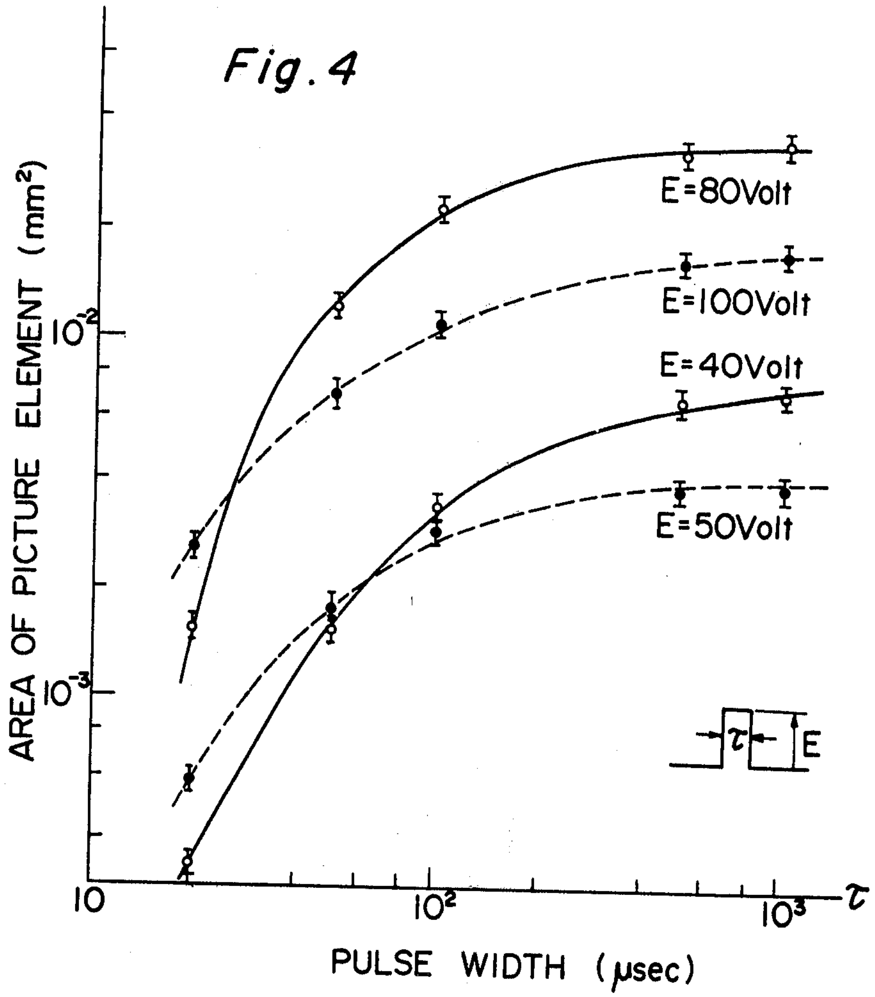
FIG. 4 is a graphic representation showing the relationship between the pulse width and the area of a picture element.
Figure 5:
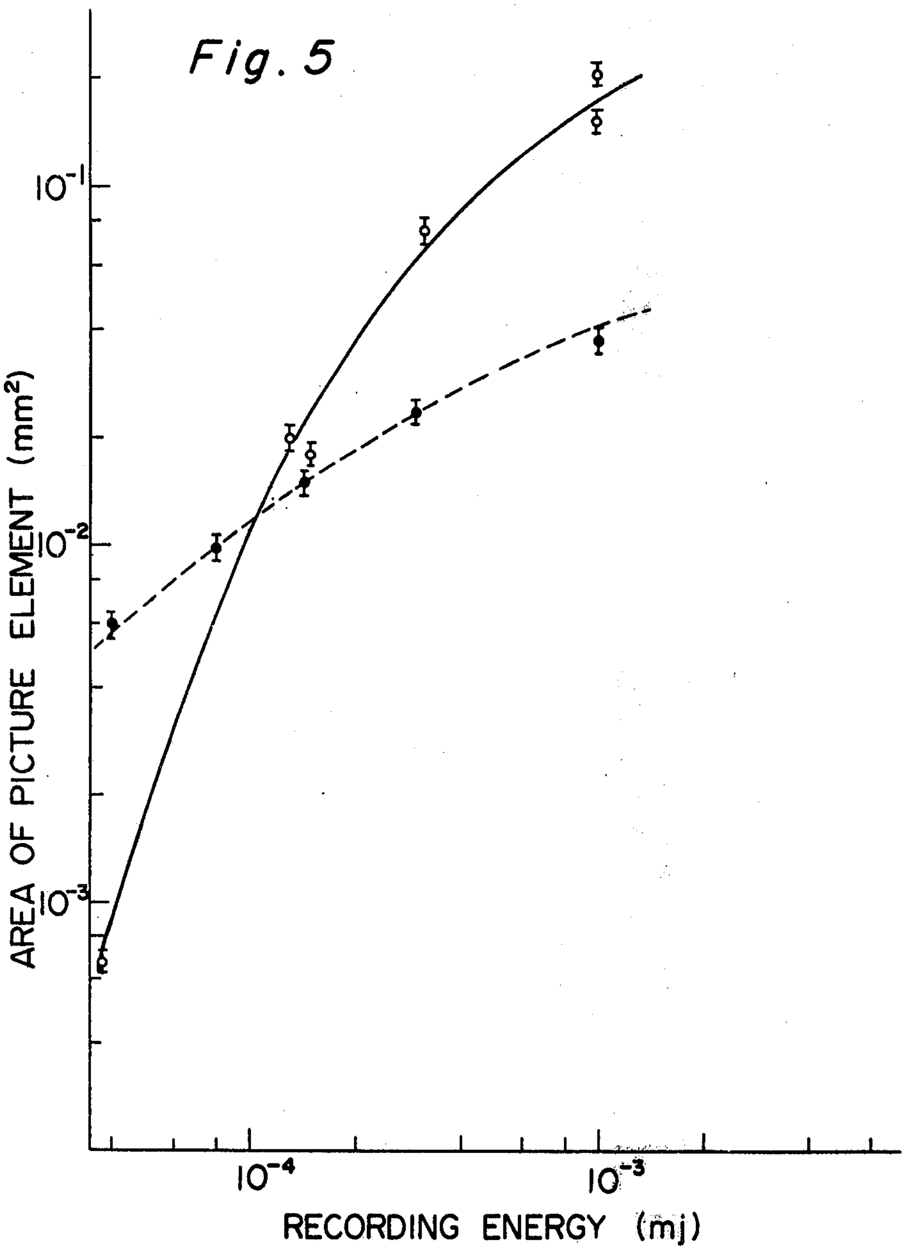
FIG. 5 is a graphic representation showing the relationship between a recording energy and the area of a picture element.

As is clear from FIGS. 3 to 5, the area of each picture element becomes larger with larger amplitude, larger pulse width and higher recording energy. It is clear from the results obtained that a pulse signal whose amplitude changes according to information, a pulse signal whose pulse width changes according to information, and a pulse signal whose amplitude and width change according to information can be used in the present invention.

Figure 2:
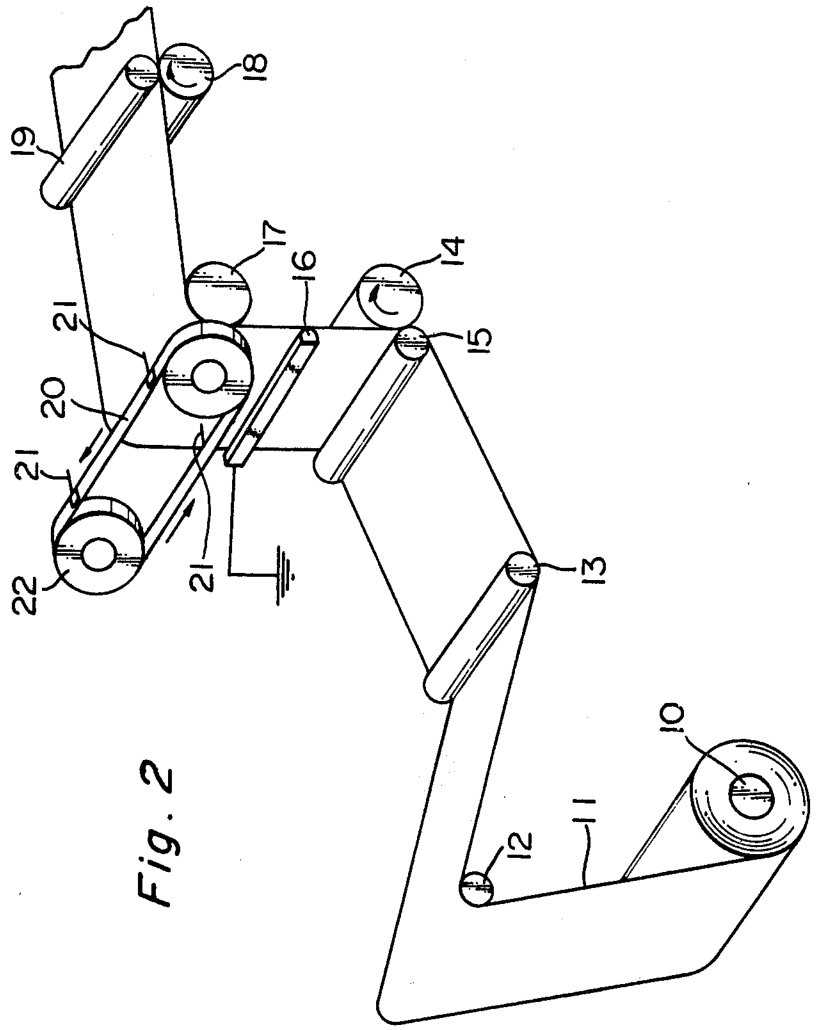
FIG. 2 is a sketch of a facsimile testing instrument.

Furthermore, by using a facsimile testing instrument of the type described in FIG. 2, a pulse-like picture element signal is applied to the needle electrode while scanning the recording electrode and the recording material, and images are formed. The operation of the facsimile tester is as follows: A ribbon-like recording material 11 is fed from a bobbin 10 through guide rollers 12 and 13, a feed roller 14, a press roller 15, a return electrode 16, a guide roller 17, a feed roller 18 and a press roller 19. Any one of three recording needle electrodes 21 provided on an endless belt 20 driven by a pulley 22 is always in contact with the recording material 11. The recording electrode 21 scans the recording material 11 in the transverse direction according to the movement of the endless belt 20 (this scanning will be referred to as main scanning), and scanns it in the longitudinal direction according to the movement of the feed rollers 14 and 18 (this scanning will be referred to as subsidiary scanning).

Images are formed on a recording material having a coating of indium low oxide using this facsimile testing instrument. The results are given in Example 3 in Table 1. 1

Table 1

| Base material of the recording material | Example 1<br>75-micron thick biaxially oriented polyethylene terephthalate film. | Example 2<br>50-micron thick biaxially oriented polyethylene terephthalate film | Example 3<br>50-micron thick biaxially oriented polyethylene terephthalate film |
|---|---|---|---|
| Coating | | | |
| Main composition | $In_xO_y$ (0<y/x<1.5) | $In_xO_y$ (0<y/x<1.5) | $In_xO_y$ (0<y/x<1.5) |
| Method of forming | Vacuum evaporation | Vacuum evaporation | Vacuum evaporation |
| Source substance | $In_2O_3$ 100% | $In_2O_3$ 90 wt.%<br>$SnO_2$ 10 wt.% | $In_2O_3$ 95 wt.%<br>$SnO_2$ 5 wt.% |
| Thickness | 1300 A | 1000 A | 400 A |
| Transmission of light at wavelength 5000 A | 5% | 3% | 5% |
| Color | Black | Black | Black |
| Surface resistivity | 100 ohms/cm² | 100 ohms/cm² | 500 ohms/cm² |
| Needle electrode | | | |
| Material | Tungsten | Tungsten | Tungsten |
| Diameter | 20 microns | 0.11 mm | 0.1 mm |
| Needle pressure | 10 g | 2.0 g | 2.0 g |
| Electric signal (pulse) | | | |
| Period (T) | — | 1 sec | 200 μ sec |
| Pulse width (τ) | 1μ sec to 10μ sec | 20μ sec to 90 m sec | 40 μ sec |
| Amplitude (E) | 24V | −30V to −120V | −30V to −100V |
| Main scanning speed | 0 | 0 | 2.0 m/sec |

Table 1-continued

| Base material of the recording material | Example 1<br>75-micron thick biaxially oriented polyethylene terephthalate film | Example 2<br>50-micron thick biaxially oriented polyethylene terephthalate film. | Example 3<br>50-micron thick biaxially oriented polyethylene terephthalate film |
|---|---|---|---|
| Subsidiary scanning speed | 0 | 10 mm/sec | 2.5 mm/sec |
| Results | *1 | *2 | *3 |

*1 A substantially circular, transparent area with a diameter of 20 to 100 microns was formed at the electrode-contacting part of the coating, according to the pulsewidth of the signal.

*2 The voltage, current and pulse width of the pulse signal were measured by a dual beam oscilloscope, and the transparent picture element part of the coating was microscopically observed. The results are given in FIGS. 3 to 5 (solid lines).

*3 An image having a gray scale was formed which had a resolution of 4/mm and an optical density difference of at least 1.

It is clear from the above description and the results obtained in the above Examples that the method (1-a) has the following advantages.

1. Information can be directly converted to images.
2. Since an image can be formed by the chemical change of the coating itself, the recording operation is simple.
3. No development is necessary.
4. The resulting images have good resolution and contrast.
5. By using a transparent material as a base, transmission-type image can be obtained.
6. High speed recording can be performed using electric signals of relatively low voltage and small current.
7. There is no occurrence of offensive smell or the scattering of dirts and dusts.
8. Since the recording material is of relatively simple structure and stable, it has good storage stability, and the recording characteristics are not affected by external conditions such as humidity. Furthermore, according to this method, recording can be performed in the dry state, and therefore, the recording operation is especially simple.

(1-b)

Figure 6:
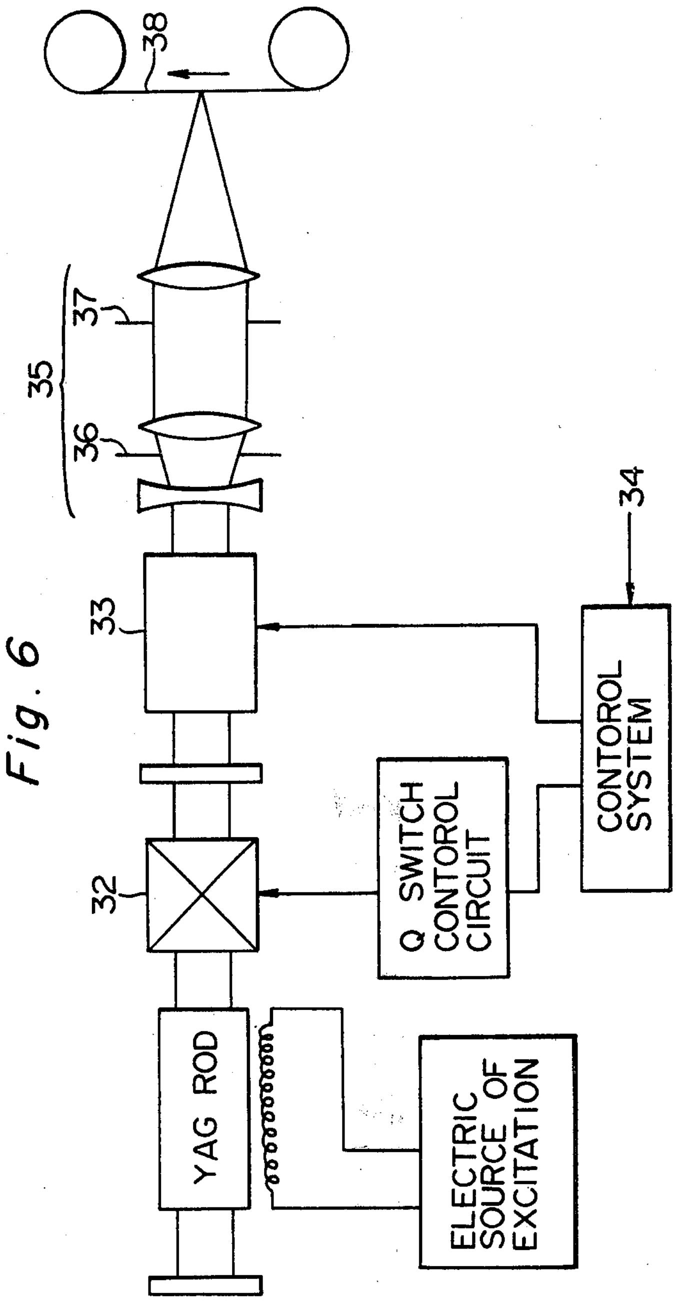
FIG. 6 is a view showing a recording device utilizing laser beam.

This method involves applying a laser beam to a non-transparent coating, and oxidizing the coating by the heat generated at that portion thereby to render it transparent and thus form images. The laser that can be used for this purpose may, for example, be YAG laser, argon gas laser or carbon dioxide gas laser. The scanning of the coating by a laser beam is carried out by an apparatus of the type shown in FIG. 6. In FIG. 6, a continuous laser beam generated from a YAG rod is converted to a pulse beam by an acoustic Q switch 32, and further modulated by an optical modulator 33 according to an electric signal 34 containing information. It is then sent to an optical system 35, and reaches a recording member 38 through an iris and a lens. The scanning of the laser beam is performed by a known acoustic optical deflector or rotating mirror (not shown). Using the YAG laser apparatus shown in FIG. 6, an image was formed on a coating of a low oxide of indium. The results are shown in Example 4 (Table 2).

Table 2

| | |
|---|---|
| Base material of the recording material | A 50-micron thick biaxially oriented polyethylene-2,6-naphthalene-dicarboxylate film |
| Coating | |
| Composition | $In_xO_y$ (O <y/x <1.5) |
| Method of formation | Vacuum evaporation |
| Source substance | $In_2O_3$ |
| Thickness | 600 A |
| Transmission of light at wavelength 500 A | 3% |
| Color | Black |
| Surface resistivity | 150 ohms/cm² |
| Laser beam | |
| Period (T) | 1 m sec |
| Pulse width ($\tau$) | 0.5$\mu$ sec |
| Peak output | 4 KW |
| output | 10 W |
| Scanning speed | 2cm/sec. |
| Number of bits written | 500 bits/cm |
| Result | A substantially circular, transparent area with an average diameter of 15 was formed. The visible light transmission of the transparent part was 75 to 90%. |

When a secondary X-ray image of the film recorded by Example 4 was observed by EMX, it was confirmed that indium atom existed in the transparent part same as in other part. Furthermore, when the transparent area was reduced by an electrolytic reaction, it became non-transparent and the recording was erased. When a laser beam was applied to this point, it again became transparent. This led to the confirmation that the transparent area was formed not by driving off the low oxide of indium that constituted the coating, but by oxidizing it.

Thus, according to method (1-b), an image is formed by a chemical change of the coating itself without scattering dirts and dusts as in the conventional recording methods utilizing laser beams, and no development is required. This method also possesses the others advantages mentioned in (1-a) above.

(1-c)

This method involves forming an electrolytic layer on a non-transparent electroconductive coating (for example, a coating of a low oxide of indium) as an anode, disposing a needle electrode as a cathode face to face with the anode through this electrolytic layer, applying to the needle electrode a pulse-like voltage whose amplitude and/or pulse width changes according to information, and thereby anodically oxidizing the coating to convert it to a transparent oxide (for example, indium oxide) and thus to effect the recording of the information.

Figure 7:
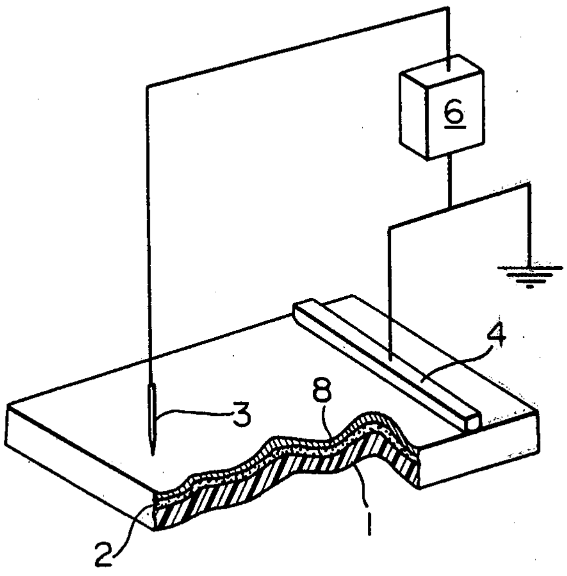
FIG. 7 is a view illustrating the principle of the recording method of this invention by electrolytic reaction.
Figure 7A:
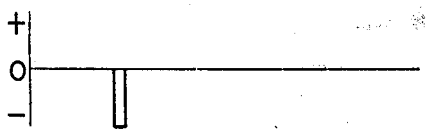

The principle of a recording apparatus for performing this method is shown in FIG. 7. This figure is the same as FIG. 1 except that an electrolytic layer 8 is formed on an electrically conductive coating 2 and a needle electrode 3 is in contact with the electrolytic layer 8. When a negative pulse signal (FIG. 7A) is applied to the needle electrode 3, the electrically conductive coating 2 near the needle electrode 3 acts as an anode and is oxidized.

The electrolytic layer 8 formed on the electrically conductive coating is composed of an electrolytic solution, if desired a transparent or non-transparent support containing an electrolytic solution or polymeric electrolyte. The electrolytic layer used may be any material that exhibits ion conductivity and has a specific conductivity of at least $10^{-10}$ ohm$^{-1}$ cm$^{-1}$.

Examples of the electrolytic layer that is used in this method are as follows:

1. Water
2. Aqueous solutions of inorganic acids such as hydrochloric acid, sulfuric acid, nitric acid, boric acid or phosphoric acid, preferably aqueous solutions of sulfuric acid, nitric acid and boric acid.
3. Aqueous solutions of organic acids such as acetic acid, oxalic acid, tartaric acid, citric acid or succinic acid, preferably aqueous solutions to tartaric acid and eitric acid.
4. Aqueous solutions of salts of said inorganic and organic acids, preferably aqueous solutions of ammonium borate, potassium hydrogen sulfate, ammonium sulfate, sodium tartrate, copper sulfate, nickel chloride, and silver nitrate.
5. Alcohols such as methanol, ethanol or gylcerol; phenols such as phenol, naphthol, hydroquinone or anthraquinone; ketones such as acetone, methyl ethyl ketone or methyl isobutyl ketone; esters such as ethyl acetate, ethyl propionate or ethyl butyrate; ethers such as dimethyl ether, diethyl ether or methyl ethyl ether; amides such as dimethyl formamide, dimethyl acetamide, pyrrolidone or N-methyl pyrrolidone; nitriles such as acetonitrile, propionitrile or benzonitrile; sulfoxides such as dimethyl sulfoxide, diethyl sulfoxide or diphenyl sulfoxide; and nitro compounds such as nitrobenzene or nitronaphthalene; preferably methanol, butyrolactone, acetonitrile, dimethyl formamide and dimethyl sulfoxide solutions.
6. Aqueous solutions of the organic compounds listed in (5), preferably aqueous solutions of methanol, butyrolactone, acetonitrile, dimethyl formamide and dimethyl sulfoxide.
7. Transparent polymeric electrolytes such as poly(vinyl benzyl trimethyl ammonium chloride), or other ammonium salts such as poly (sodium acrylate), poly (sodium alginate), or other salts of polyacids.

The electrolytic solutions or polymeric electrolytes may be used in mixture. Above all, solutions containing water or electrolytes, and polymeric electrolytes are especially preferred because voltage required for electrolysis may be low.

The depositing of the electrolytic layer on the surface of the recording material is performed, for example, by a method in which the recording material is immersed in an electrolytic solution, a method in which the recording material is immersed in an electrolytic solution and then withdrawn while retaining the electrolytic layer, a method in which an electrolytic solution or polymeric electrolyte is coated on the recording material, a method in which it is sprayed onto the recording material, or a method in which an electrolytic solution is injected from a needle electrode at the time of recording. Any method can be utilized in this invention by which the electrolytic layer can be retained on the surface of the recording coating.

Preferably, however, a transparent polymeric electrolyte is coated on the recording material, or a support containing a polymeric electrolyte or electrolytic solution is provided on the recording material. A material that forms a porous or hydrophilic film can be used as the support. Examples are a carboxymethyl cellulose film, cellophane film, collodion film, gelatin film, agar film, or polyvinyl alcohol film or paper-like sheet. The thickness of the support is preferably several microns to several hundred microns in order not to affect the low voltage recording characteristics adversely.

Since in this method, it is not necessary to dissolve a specific metallic ion from the needle electrode, the needle electrode can be made of any desired electrically conductive material. Examples of such a material include various metals, alloys, graphite, electrically conductive plastics, glass and ceramics which have been rendered electrically conductive by various methods.

The recording characteristics of a coating composed of a low oxide of indium were examined by a recording apparatus of the type shown in FIG. 7. Example 5 (Table 3) refers to the case where cellophane film impregnated with water was used as the electrolytic layer 8, and Example 6, to the case where a 20$\mu$ thick poly(vinyl benzyl trimethyl ammonium chloride) film coated on the coating was used as the electrolytic layer 8. Furthermore, using the recording material in accordance with Example 6, the relation between the amplitude and the area of a picture element, the relation between the pulse width and the area of a picture element, and the relation between the recording energy and the area of a picture element were examined. The results are shown in FIGS. 3, 4 and 5 in broken lines.

Figure 8:
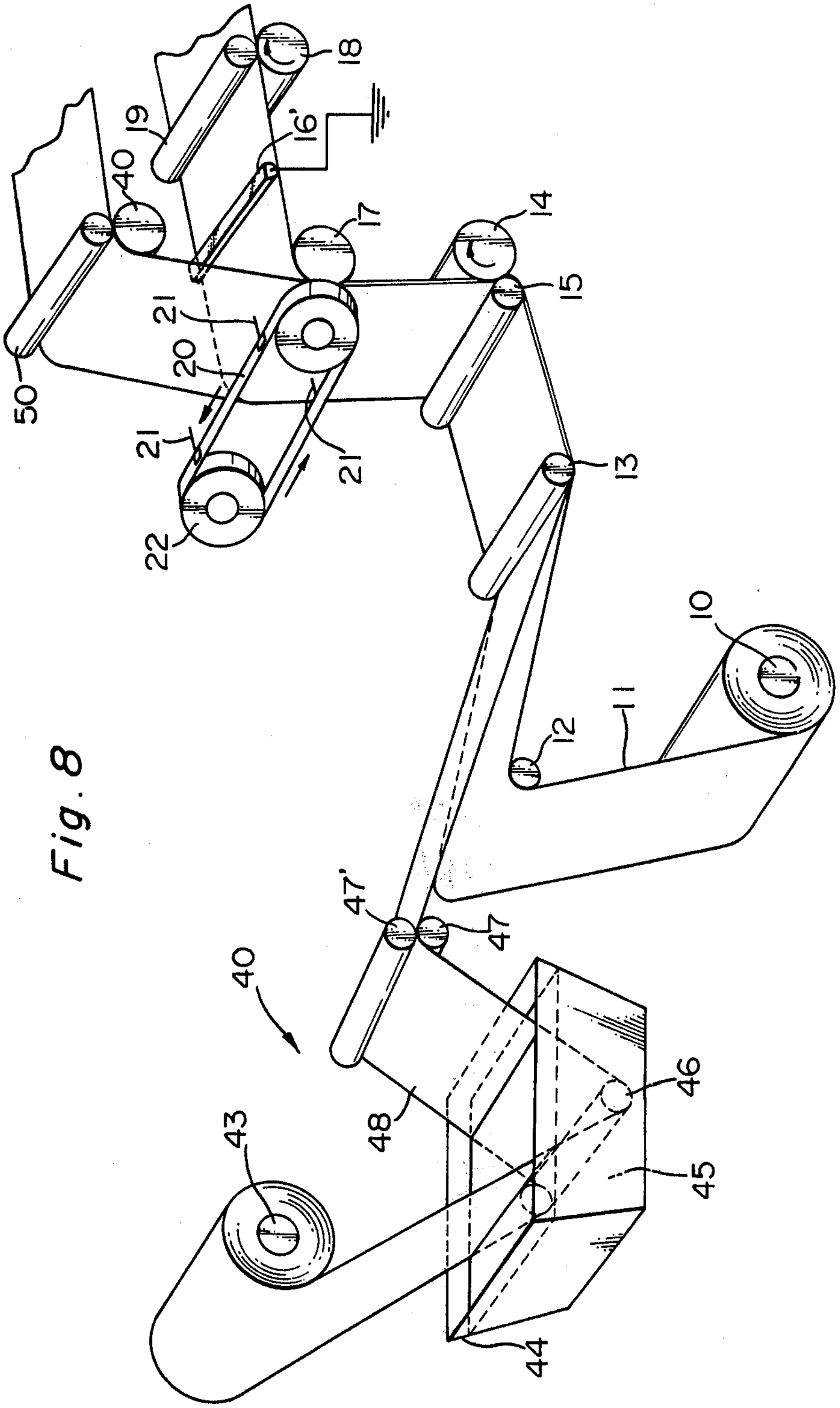
FIG. 8 is a sketch of a facsimile testing instrument equipped with a mechanism for feeding an electrolytic solution supporting material.

Then, by using a facsimile testing instrument of the type shown in FIG. 8, an image was formed by applying a pulse signal to a recording electrode while scanning the recording material. The facsimile testing instrument shown in FIG. 8 is the same as that shown in FIG. 2 except that it further includes a device 40 for feeding a support 48 (for example, cellophane film) for retaining an electrolytic solution. The operation of the device for feeding the support is as follows: The support 48 is fed from a bobbin 43 through a water tank 44 containing an electrolytic solution 45, a guide roller 46, squeezing rollers 47, 47', guide roller 13, a feed roller 14, a press roller 15, a guide roller 17, a feed roller 49, and a press roller 50. In this method, a return electrode 16' in contact with the recording material 11 is used instead of the return electrode 16 (FIG. 2). Thus, a recording electrode 21 comes into contact with the surface coating of the recording material through the support 48 containing the electrolytic solution. Using this facsimile testing instrument, an image was formed on a coating of a low oxide of indium. The results are shown in Table 3 (Example 7).

When a polymeric electrolyte is used as the electrolytic layer, a support of the electrolytic solution is not required, and therefore, images can be formed by using the facsimile testing instrument shown in Table 2.

As is clear from the above description and the results of the Example, according to method (1-c), the structure of the recording material is simple in structure and has good storability as compared with the conventional electrolytic recording methods, and the recording characteristics of the recording material are not affected by external conditions such as humidity. Furthermore, according to this method, images are formed by chemical change of the coating itself, and any desired electrically conductive materials can be utilized for providing the electrolytic layer and the needle electrode. Further, since water can be used as the electrolytic layer, the operation is simple. Furthermore, when a dry polymeric electrolyte coated on the coating as the electrolytic layer is utilized, recording can be effected in the dry state. The method (1-c) also possesses the advantages (1) to (7) mentioned above with regard to method (1-a).

ing to the electrode a pulse signal whose amplitude and/or pulse width changes according to information, and thereby reducing the coating to a non-transparent low oxide or metal to record the information.

Figure 7B:

The principle of the recording device for performing this method is the same as that of the apparatus shown in FIG. 7. A positive pulse signal (FIG. 7B) is applied to the recording electrode 3 for reducing the coating. The construction of the electrolytic layer 8 provided on the electrically conductive coating 3, the method of depositing the electrolytic layer, and the construction of the needle electrode may be the same as those mentioned in the description of the electrolytic oxidation method of (1-c).

Using the recording device shown in FIG. 7, the recording characteristics of two coatings composed of indium (III) oxide and a coating compound of copper iodide wer examined. The results are shown in Table 4 (Examples 9, 10, 11 and 12). An image was formed by applying a pulse signal to a needle electrode while scanning the recording material by a facsimile testing instrument of the type shown in FIG. 9. The results are Table 3

| Base material of the recording material | Example 5<br>75μ-thick biaxially oriented polyethylene terephthalate film | Example 6<br>50μ-thick biaxially oriented polyethylene naphthalate film | Example 7<br>50μ-thick biaxially oriented polyethylene terephthalate film | Example 8<br>50μ-thick biaxially oriented polyethylene terephthalate film |
|---|---|---|---|---|
| Coating | | | | |
| Main composition | InxOy (O<y/x<1.5) | InxOy (O<y/x<1.5) | InxOy (O<y/x<1.5) | InxOy (O<y/x<1.5) |
| Method of forming | Vacuum evaporation | Vacuum evaporation | Vacuum evaporation | Vacuum evaporation |
| Source substance | $In_2O_3$ 100% | $In_2O_3$ 95% by weight<br>$SnO_2$ 5% by weight | $In_2O_3$ 90% by weight<br>$SnO_2$ 10% by weight | $In_2O_3$ 95% by weight<br>$SnO_2$ 5% by weight |
| Thickness | 1300 A | 400 A | 1000 A | 400 A |
| Transmission of light at wavelength 5000 A | 5 % | 5 % | 3 % | 5 % |
| Color | Black | Black | Black | Black |
| Surface resistivity | 100 ohms/cm² | 500 ohms/cm² | 100 ohms/cm² | 500 ohms/cm² |
| Needle electrode | | | | |
| Material | nickel | platinum | nickel | nickel |
| Diameter | 0.02 mm | 0.1 mm | 0.11 mm | 0.02 mm |
| Needle pressure | 10 g | 20 g | 10 g | 2.0 g |
| Electrolytic solution or electrolyte | Water | Poly(vinyl benzyl trimethyl ammonium chloride) | Water | Water (ion-exchange water) |
| Support | Cellophane (10 μ thick) | None | Cellophane (10 μ thick) | Cellophane (10μ thick) |
| Electric signal (pulse) | | | | |
| Period (T) | — | — | 1 sec | 500 μsec |
| Pulse width (τ) | 1 – 2 msec | 10 msec | 20 μsec to 90 msec | 100 μsec |
| Amplitude (E) | −20 V to −30 V | −10 V to −20 V | −30 V to −120 V | −50V to −120 V |
| Main scanning speed | 0 | 0 | 0 | 1.1 m/sec |
| Subsidiary scanning speed | 0 | 3.3 mm/min | 10 mm/min | 2.1 mm/sec |
| Result | A substantially circular transparent area was formed on the coating immediately below the needle electrode. | Same as Example 5 | The voltage current and width of the pulse signal were measured by a dual beam oscilloscope, and a transparent picture element area was observed microscopically, the results are shown in FIGS. 3 to 5 (broken lines). | An image with gray scale having a resolution of 4/mm and an optical difference of 1.0 was formed on the coating |

2. Method of forming images by successively reducing a transparent coating according to an electric signal to render it non-transparent:

This method involves forming an electrolytic layer on a transparent electrically conductive coating (for example, a coating of indium (III) oxide) as a cathode, disposing a needle electrode as an anode face to face with the cathode through the electrolytic layer, applyshown in Table 4 (Example 13).

As is seen from the above description and the Examples, according to method (2), the structure of the recording material is simple as compared with the conventional electrolytic recording methods, and since the electrically conductive coating itself chemically changes from the transparent state to the non-transparent state, the recording operation is as simple as in the method (1-c). Furthermore, this method has the advantage that when a dry polymeric electrolyte coated on the coating as the electrolytic layer is utilized, recording can be performed in the dry state.

the electrically conductive coating near the needle electrode, thereby recording the information on the electrically conductive coating as transparent and non-transparent areas.

Table 4

| Base material of recording material | Example 9 50μ-thick polyethylene terephthalate film | Example 10 50μ-thick polyethylene naphthalate film | Example 11 75μ-thick polyethylene naphthalate film | Example 12 200μ-thick polyvinyl chloride sheet | Example 13 50μ-thick polyethylene terephthalate film |
|---|---|---|---|---|---|
| Coating (non-transparent) | | | | | |
| Method of formation | Vacuum evaporation | Vacuum evaporation | Vacuum evaporation | Chemical plating | Vacuum evaporation |
| Source material | $In_2O_3$ | $In_2O_3$ 95 wt.% $SnO_2$ 5 2t.% | $In_2O_3$ | Cu | $In_2O_3$ 95 wt.% $SnO_2$ 5 wt.% |
| Thickness | 1200 A | 400 A | 1000 A | 600 A | 400 A |
| Transmission of light at wavelength 5000 A | 20 % | 5 % | 3 % | 55 % | 5 % |
| Surface resistivity | 450 ohms/cm² | 500 ohms/cm² | 1110 ohms/cm² | 5 ohms/cm² | 500 ohms/cm² |
| Method of rendering the coating treatment | *1 | *2 | *3 | *4 | *5 |
| Transparent Coating | | | | | |
| Main composition | $In_2O_3$ | $In_2O_3$, $SnO_2$ | $In_2O_3$ (containing a tiny amount of Sn) | CuI | $In_2O_3$, $SnO_2$ |
| Thickness | 1200 A | 400 A | 1000 A | 500 A | 400 A |
| Transmission of light at wavelength 5000 A | 90 % | 90 % | 95 % | 88 % | 90 % |
| Surface resistivity | 4 kiloohms/cm² | 650 ohms/cm² | 500 ohms/cm² | 7 kiloohms/cm² | 650 ohms/cm² |
| Needle electrode (anode) | | | | | |
| Material | Platinum | Platinum | Platinum | Platinum | Platinum |
| Diameter | 0.02 mm | 0.1 mm | 0.02 mm | 0.02 mm | 0.02 mm |
| Pressure | 0 | 1 g | 0 | 0 | 2 g |
| Electric signal (pulse) | | | | | |
| Period (T) | — | — | — | — | 500 μ sec |
| Pulse width (τ) | 1 msec to 4 msec | 10 msec | 1 msec to 4 msec | 1 msec to 4 msec | 100 μ sec |
| Amplitude (E) | +5 to +16 V | +30 to +40 V | +5 to +16 V | +5 to +16 V | +50 to +120 V |
| Main scanning speed | 0 | 0 | 0 | 0 | 1.1 m/sec |
| Sudsidiary scanning speed | 0 | 3.3 mm/min | 0 | 0 | 2.1 mm/sec |
| Electrolytic solution or electrolyte | Water | Poly(vinyl benzyl trimethyl ammonium chloride) | Water | Water | Water |
| Support | None | None | None | None | Cellophane (10 μ thick) |
| Results | **1 | **2 | **3 | *4 | *5 |

*1 Anodic oxidation method in which a voltage of 160V was applied in dimethyl sulfoxide.
*2 Heat-treatment in air at 200°C. for 25 minutes while placing the film under tension.
*3 Heat-treated in air at 220°C. for 15 minutes while placing the film under tension.
*4 Iodization method in which the coating was dipped in a 1% toluene solution of iodine.
*5 Same as *2.
**1 A substantially circular black brown area with high reflectivity was formed on the transparent recording material immediately below the needle electrode.
2 Same as 1.
3 Same as 1.
4 Same as 1.
**5 An image having the metalic lustre and high reflectivity was formed on the transparent recording material. The optical difference is at least 1.0. The image had gray scale.

3. Method for forming images by successively and selectively oxidizing or reducing a non-transparent coating according to an electric signal, and forming the images by a transparent area formed by oxidation and an area which assmes a substantially metallic color by reduction:

This method involves using a non-transparent electrically conductive coating (for example, a coating of a low oxide of indium) as one electrode, disposing a needle electrode face to face with the coating through an electrolytic layer, scanning the needle electrode relative to the coating, applying between both electrodes a pulse signal which changes to a positive or negative voltage according to a time sequential information, and thus electrolytically oxidizing or reducing According to this method, the characteristics of recording are hardly affected by the initial transparency of the coating, coating of a desired degree of transparency can be utilized. However, coatings having a visible light transmission of 5 to 70% are especially preferred. The electrolytic layer utilized for an electrolytic reaction may be any material that exhibits ionic conductivity, and the many materials as mentioned with regard to method (1-c) can be utilized. Furthermore, various methods of depositing the electrolytic layer on the surface of the recording layer and various supports for the electrolytic layer as described with regard to method (1-c) above can be utilized.

The voltage of the electric signal is at least 5V, preferably at least 10V in order to perform sufficient electrolytic oxidation and reduction although depending on the thickness of the coating, the scanning speed and the type of the electrolyte used.

Figure 7C:
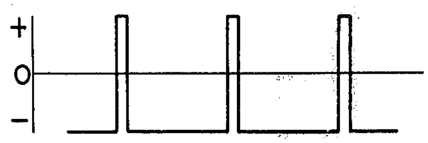

The principle of a recording apparatus for performing this method is the same as that of the apparatus shown in FIG. 7. A pulse signal (FIG. 7C) which changes to a positive or negative signal is generated from a pulse generator 6, and applied to a recording electrode 3 for selectively oxidizing and reducing a electrically conductive coating 3. If the voltage of the received signal is limited either to a positive voltage (or negative voltage), an electric signal which changes to a positive or negative signal can be obtained by superposing a suitable direct current bias voltage on the signal.

This method was performed by using the apparatus shown in FIG. 7, and the results are shown in Table 5 (Examples 14 and 15). As the electrolytic layer 8, water was used in Example 1, and a poly(sodium acrylate)/polyvinylalcohol/potassium nitrate mixture was used in Example 15.

As is seen from the above description and the Examples, according to method (3), images of very high contrast can be directly formed on a coating of a desired degree of transparency. Furthermore, since the electrically conductive coating itself changes chemically, the recording operation is as simple as in the case of method (1-c).

electrode as an anode face to face with the coating through an electrolytic layer, applying to the needle electrode a pulse signal which changes in amplitude and/or pulse width according to information while scanning the needle electrode relative to the coating, and thus electrically reducing the coating to deposit the metal. Then, the entire coating is heat-treated at a relatively low temperature which does not impair the base material (for example, about 120° to 250°C. in air in the case of a recording material consisting of a polyester film and a coating of a low oxide of indium) in an oxidizing atmosphere for 1 to 120 minutes, thereby to oxidize the unreduced part of the coating and render it transparent. Since at such a low temperature, thenon-transparent part on which metal has deposited as a result of the reduction of the coating is not oxidized but remains non-transparent, there is formed an image which consists of the transparent area and the non-transparent area.

Since according to this method, the characteristics of recording are scarcely affected by the original transparency of the coating, coatings of any desired transparency can be utilized. However, those having a visible light transmission of 5 to 70% are preferred. The electrolytic solution used for electrolytic reaction may be any materials which exhibit ionic conductivity. The many materials as described with regard to method Table 5

| Base material of the recording material | Example 14<br>75$\mu$-thick biaxially oriented polyethylene terephthalate film | Example 15<br>50$\mu$-thick polyethylene naphthalate film | Example 16*<br>50$\mu$-thick biaxially oriented polyethylene naphthalate film |
|---|---|---|---|
| Coating | | | |
| Main composition | InxOy (O<y/x<1.5) | Low oxide of indium | InxOy (O<y/x<1.5) |
| Method of forming | Vacuum evaporation | Vacuum evaporation | Vacuum evaporation |
| Source substance | $In_2O_3$ 100 % | $In_2O_3$ 95 % by weight<br>$SnO_2$ 5 % " | $In_2O_3$ 100 % |
| Thickness | 700 A | 400 A | 150 A |
| Transmission of light at wavelength 5000 A | 29 % | 5 % | 35 % |
| Color | | Black | Black |
| Surface resistivity | 600 ohms/cm² | 500 ohms/cm² | 2 kiloohms/cm² |
| Needle electrode | | | |
| Material | Nickel | Platinum | Nickel |
| Diameter | 0.02 mm | 0.1 mm | 0.02 mm |
| Needle pressure | 0 | 10 g | interval of 10.2 mm |
| Electrolytic solution or electrolyte | Water | Poly(sodium acrylate)/ polyvinyl alcohol/ potassium nitrate | Water |
| Support | None | None | None |
| Electric signal (pulse) | | | |
| Period (T) | 100 msec | 100 msec | 100 msec |
| Pulse width ($\tau$) | 10 msec (positive pulse width) | 10 msec (positive pulse width) | 10 msec |
| Amplitude (E) | +20 V, −20 V | +40 V, −40 V | +20 V |
| Main scanning speed | 0 | 0 | 0 |
| Subsidiary scanning speed | 2 cm/sec | 3.3 cm/sec | 2 mm/sec |
| Results | An image of high contrast was formed which consisted of a light-reflecting area having the color of indium metal and a transparent area. | Same as Example 14 | Same as Example 14 |

*Heat-treated 210°C. for 20 minutes under biaxial tension.

4. Method for forming images by successively reducing a non-transparent coating according to an electric signal to form an area which assumes the metalic lustre, and then oxidizing the unreduced part of the coating to render it transparent:

This method involves using a non-transparent electrically conductive coating (for example, a coating of a low oxide of indium) as a cathode, disposing a needle (1-c) can be utilized. Furthermore, the same methods of depositing the electrolytic solution on the surface of the recording layer and the same constructions of the needle electrode as described with regard to method (1-c) can be utilized.

The voltage of the electric signal is preferably at least 5V, especially at least 10V in order to perform sufficient electrolytic reduction although depending on the thickness of the coating, the scanning speed and the type of the electrolyte.

Figure 7D:
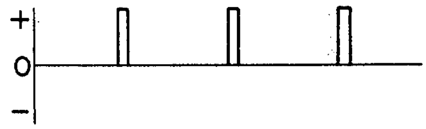

The principle of a recording device for performing this method is the same as that of the device shown in FIG. 7. In order to reduce the electrically conductive coating 3 partially, a positive pulse signal (FIG. 7D) is applied to needle electrode 3 from a pulse generator.

This method was performed by the apparatus shown in FIG. 7, and the results obtained are shown in Table 5 (Example 16).

According to this method, images of very high contrast can also be formed on a coating of a desired degree of transparency.

What is claimed is:

1. A method for forming images in which an electrically conductive coating, formed on a base material, which coating comprises at least one of the group of indium, tin, titanium, and zirconium, and is substantially opaque and lowly oxidized, is successively oxidized by directly contacting a recording electrode with the coating, applying an electrical signal across the recording electrode and the coating, having the electrode scan relative to the coating so that the coating is selectively heated and oxidized by the electric current which flows in response to the electrical signal to form images composed of substantially transparent parts in the base material.

2. A method of claim 1 wherein said electrical signal is a pulse signal which changes in energy according to the optical density of an original picture.

3. A method of claim 1 wherein substantially opaque parts of said coating have a visible light transmission factor of less than 30%.

4. A method of claim 1 wherein said coating contains at least 80% by weight of a lowly oxidized indium, and has a thickness of 50 to 5000 angstroms, a surface resistivity of not more than 100 kiloohms/$cm^2$, and a visible light transmission factor of less than 30%.

5. A method of claim 4 wherein said coating contains not more than 20% by weight of a lowly oxidized tin.

6. A method of claim 1 wherein said base material is composed of a flexible material.

7. A method of claim 6 wherein said flexible material is a transparent biaxially oriented polyester.

* * * * *

UNITED STATES PATENT AND TRADEMARK OFFICE

CERTIFICATE OF CORRECTION

PATENT NO. : 3,967,285

DATED : June 29, 1976

INVENTOR(S) : Shigenobu Sobajima et al.

It is certified that error appears in the above-identified patent and that said Letters Patent are hereby corrected as shown below:

Item 30, line 2, delete "48-69039", insert -- 47-69039 --

Signed and Sealed this

Twenty-third Day of November 1976

[SEAL]

*Attest:*

RUTH C. MASON
*Attesting Officer*

C. MARSHALL DANN
*Commissioner of Patents and Trademarks*